(12) United States Patent
Jablonski et al.

(10) Patent No.: US 7,377,702 B2
(45) Date of Patent: May 27, 2008

(54) CAGELESS, PLUGGABLE OPTOELECTRONIC DEVICE WHICH ENABLES BELLY-TO-BELLY LAYOUTS

(75) Inventors: John Jablonski, Chicago, IL (US); Anthony S. Kowalkowski, Chicago, IL (US); Bruce Peterson, Schaumburg, IL (US)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 11/439,044

(22) Filed: May 23, 2006

(65) Prior Publication Data

US 2007/0280604 A1 Dec. 6, 2007

(51) Int. Cl.
G02B 6/42 (2006.01)
(52) U.S. Cl. ........................................ 385/92
(58) Field of Classification Search ............ None
See application file for complete search history.

(56) References Cited

U.S. PATENT DOCUMENTS

| | | | |
|---|---|---|---|
| 5,481,634 A | 1/1996 | Anderson et al. ............ 385/76 |
| 5,717,533 A | 2/1998 | Poplawski et al. .......... 361/752 |
| 5,734,558 A | 3/1998 | Poplawski et al. .......... 361/752 |
| 5,864,468 A | 1/1999 | Poplawski et al. .......... 361/753 |
| 5,879,173 A | 3/1999 | Poplawski et al. .......... 438/138 |
| RE36,820 E | 8/2000 | McGinley et al. .......... 361/752 |
| 6,430,053 B1 | 8/2002 | Peterson et al. ............ 361/728 |
| 6,530,699 B1 * | 3/2003 | Gilliland et al. ............. 385/88 |
| 6,551,117 B2 | 4/2003 | Poplawski et al. ........... 439/92 |
| 6,570,768 B2 | 5/2003 | Medina ...................... 361/747 |
| 6,778,399 B2 | 8/2004 | Medina et al. ............. 361/729 |
| 7,023,703 B2 * | 4/2006 | Peloza ........................ 361/727 |
| 2005/0281514 A1 * | 12/2005 | Oki et al. ...................... 385/92 |

OTHER PUBLICATIONS

U.S. Appl. No. 11/234,575, filed Sep. 23, 2005, Kowalkowski et al.
Small Form-Factor Pluggable (SFP) Transceiver Multisource Agreement (MSA), dated Sep. 14, 2000.

* cited by examiner

*Primary Examiner*—Rodney Bovernick
*Assistant Examiner*—Mike Stahl
(74) *Attorney, Agent, or Firm*—Karl D. Kovach

(57) ABSTRACT

The device includes a housing, a printed circuit board, a first optical subassembly, a second optical subassembly, and a lever. The device is pluggable to a host structure. The housing has a flange. The printed circuit board is mounted to the housing. The first and second optical subassemblies are mounted to the printed circuit board. The lever is rotatably mounted to the housing. The lever includes a rotatably mounted portion, a hook, and an actuation surface for actuation by a user. In a plugged into and locked position of the device with the host structure, the flange of the housing is in electrical communication with a faceplate of the host structure, and the hook engages a slot.

13 Claims, 11 Drawing Sheets

CAGELESS, PLUGGABLE OPTOELECTRONIC DEVICE WHICH ENABLES BELLY-TO-BELLY LAYOUTS

BACKGROUND OF THE INVENTION

1. Field of the Invention

The present invention pertains to optoelectronic devices. The invention more particularly concerns a pluggable, optoelectronic device which does not plug into a cage and which enables belly-to-belly layouts.

2. Discussion of the Background

Optoelectronic transceivers are utilized to interconnect circuit cards of communication links and other electronic modules or assemblies. Various international and industry standards define the type of connectors used to interface computers to external communication devices such as modems, network interfaces, and other transceivers. A well-known type of transceiver module known as a Gigabit Interface Converter (GBIC) provides an interface between a computer and an Ethernet, Fibre Channel, or other data communication environment. Optoelectronic devices are disclosed in U.S. Pat. Nos. 5,717,533; 5,734,558; 5,864,468; 5,879,173; 6,570,768; and Re 36,820, all of which are hereby incorporated herein by reference. Electronics associated with the optoelectronic devices are disclosed in U.S. Pat. Nos. 5,812,582; 5,812,717; 6,108,114; 6,160,647; 6,607,307; 6,711,189; and Re 36,491, all of which are hereby incorporated herein by reference.

Miniaturization of these transceivers is desirable in order to increase the port density associated with the network connection (switch boxes, cabling patch panels, wiring closets, computer I/O, etc.). Various standards are known that define form factors for miniaturized electronic devices, such as the Small Form-Factor Pluggable (SFP) standard that specifies an enclosure 9.8 millimeters in height by 13.5 millimeters in width and having a minimum of 20 electrical input/output connections. The specific standards for SFP transceivers are set forth in the "Small Form-Factor Pluggable (SFP) Transceiver Multisource Agreement (MSA)," dated Sep. 14, 2000. Such optoelectronic devices are disclosed in U.S. Pat. Nos. 6,430,053; 6,551,117; 6,570,768; 6,778,399, all of which are hereby incorporated herein by reference.

Each SFP transceiver is plugged into a cage or receptacle of the host structure. The cage is mounted to a circuit board of the host structure. The cage is designed to limit the propagation of electromagnetic radiation. The cage must be attached to the circuit board of the host structure. Also, the cage takes up space on the circuit board of the host structure.

Accordingly, there is a need for an optoelectronic device which does not utilize much of the area of a circuit board of the host structure, minimizes the number of parts needed so as to use the optoelectronic device, and is easily insertable into and removable from a host structure by an operator.

SUMMARY OF THE INVENTION

It is an object of the invention to provide a device which is easily insertable into and removable from a host structure by an operator or user.

It is another object of the invention to provide a device which minimizes the amount of area that is occupied on the circuit board of the host structure by the device.

It is still further an object of the invention to provide a device which minimizes the number of piece parts that are required to enable the device to operate.

It is yet still further an object of the invention to provide a device which enables belly-to-belly layouts.

In one form of the invention the device includes a housing, a printed circuit board, a first optical subassembly, a second optical subassembly, a gasket, a mounting rail, a lever, and a spring. The housing includes a flange, and a guide. The printed circuit board is mounted to the housing, and the printed circuit board has contact traces. The first and second optical subassemblies are mounted to the printed circuit board. The gasket is positioned near the flange of the housing, and the gasket is electrically conductive. The mounting rail is attached to a circuit board of a host structure, and the mounting rail has a slot, aperture, or depression. The lever is rotatably mounted to the housing. The lever includes a rotatably mounted portion, a hook, and an actuation surface for actuation by a user. The spring interacts with the lever and the housing. When the housing is initially introduced into the host structure, the mounting rail enters the guide of the housing and contacts the hook, the contact between the hook and the mounting rail causes the lever to rotate, and the rotated lever causes the spring to elastically deform, the deformed spring urges the lever back toward an un-rotated position, and wherein, upon further insertion of the housing into the host structure, the hook lines up with the slot of the mounting rail, and, due to the urging of the deformed spring, the hook enters the slot so as to lock the device to the host structure, and furthermore, in a plugged into and locked position of the housing with the host structure, the gasket contacts and makes an electrical connection with a faceplate of the host structure and the flange of the housing so that the faceplate of the host structure is in electrical communication with the flange of the housing.

In still yet another form of the invention the device includes a first housing, a second housing, a first optical subassembly, a second optical subassembly, a third optical subassembly, a fourth optical subassembly, a first printed circuit board, a second printed circuit boars, a first gasket, a second gasket, a first mounting rail, a second mounting rail, a first lever, and a second lever. The first housing includes a flange, and a guide. The second housing includes a flange, and a guide. The first and second optical subassemblies are mounted to the first printed circuit board. The third and fourth optical subassemblies are mounted to the second printed circuit board. The first printed circuit board is mounted to the first housing, and the first printed circuit board has contact traces. The second printed circuit board is mounted to the second housing, and the second printed circuit board has contact traces. The first gasket is positioned near the flange of the first housing, and the first gasket is electrically conductive. The second gasket is positioned near the flange of the second housing, and the second gasket is electrically conductive. The first mounting rail is attached to a first surface of a circuit board of a host structure, and the first mounting rail has a slot, aperture, or depression. The second mounting rail is attached to a second surface of the circuit board of the host structure, and the second mounting rail has a slot, aperture, or depression. The first lever is rotatably mounted to the first housing. The first lever includes a rotatably mounted portion, a hook, and an actuation surface for actuation by a user. The second lever is rotatably mounted to the second housing. The second lever includes a rotatably mounted portion, a hook, and an actuation surface for actuation by the user. In a plugged into and locked position of the first housing with the host structure, the first gasket contacts and makes an electrical connection with a faceplate or bezel of the host structure and the first flange of the first housing so that the faceplate of the host structure is in electrical communication with the first flange of the first housing, the hook of the first lever engages the slot of the first mounting rail, and the guide of the first housing engages the first mounting rail. And, in a plugged into and locked position of the second housing with the host structure, the second gasket contacts and makes an electrical connection with the faceplate or bezel of the host structure and the second flange of the second housing so that the faceplate of the host structure is in electrical communication with the second flange of the second housing, the hook of the second lever engages the slot of the second mounting rail, and the guide of the second housing engages the second mounting rail. When both the first housing and the second housing are locked into position with the host structure, then the second housing opposes the first housing, and the second housing is separated from the first housing by the circuit board of the host structure and such a positioning of the first housing and the second housing in the host structure is known as a belly-to-belly layout.

Thus, the invention achieves the objectives set forth above. The invention provides a device which is able to be easily inserted into and removed from a host structure, does not take up as much area on a circuit board of a host structure as compared to other optoelectronic devices, does not require a cage, and which enables belly-to-belly layouts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 1:
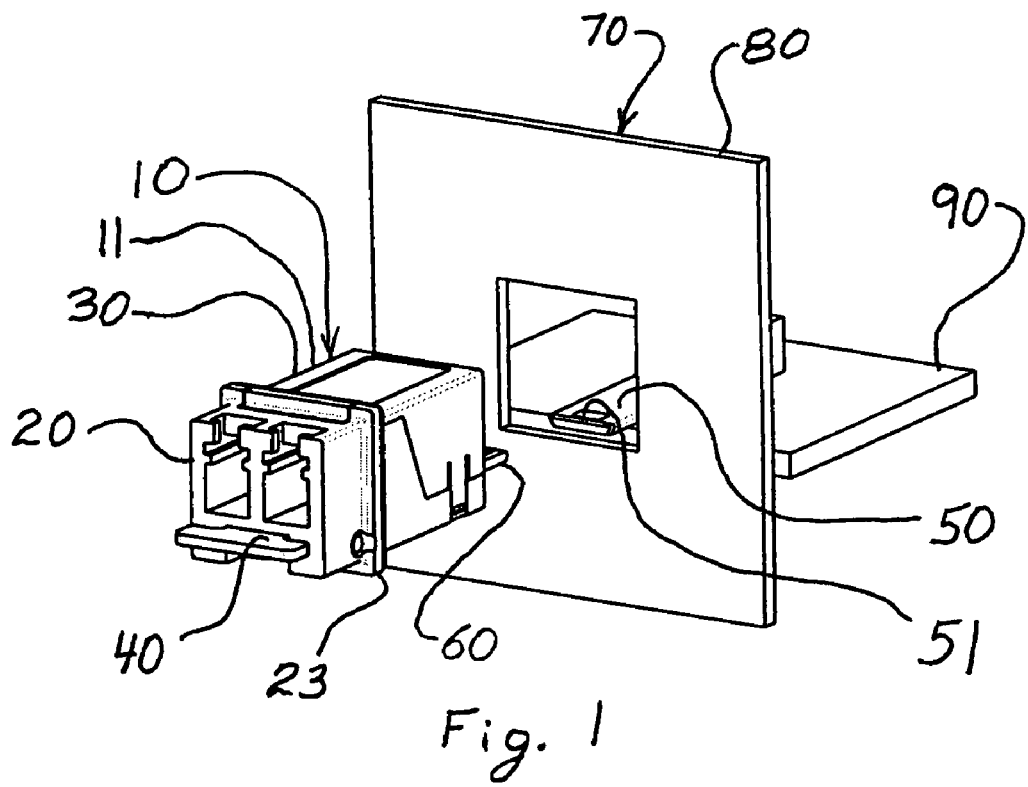
FIG. 1 is a perspective view of an optoelectronic device of the invention, and a portion of a host structure.

Referring now to the drawings, wherein like reference numerals designate identical or corresponding parts throughout the several views, and more particularly to FIGS. 1-23 thereof, embodiments of the present invention are displayed therein.

FIG. 1 is a perspective view of an embodiment of an optoelectronic device 10 and a portion of a host structure 70. The optoelectronic device 10 includes a housing 11, a printed circuit board 60, a first optical subassembly, a second optical subassembly, and a lever 40. The housing 11 is made up of a base 20 and a cover 30. The housing 11 includes a flange 23. The flange 23 is formed on the base 20. The host structure 70 includes a faceplate 80, a circuit board 90, and a connector 100. A mounting rail 50 can be attached to the circuit board 90 of the host structure 70. The mounting rail 50 includes a slot 51.

Figure 2:
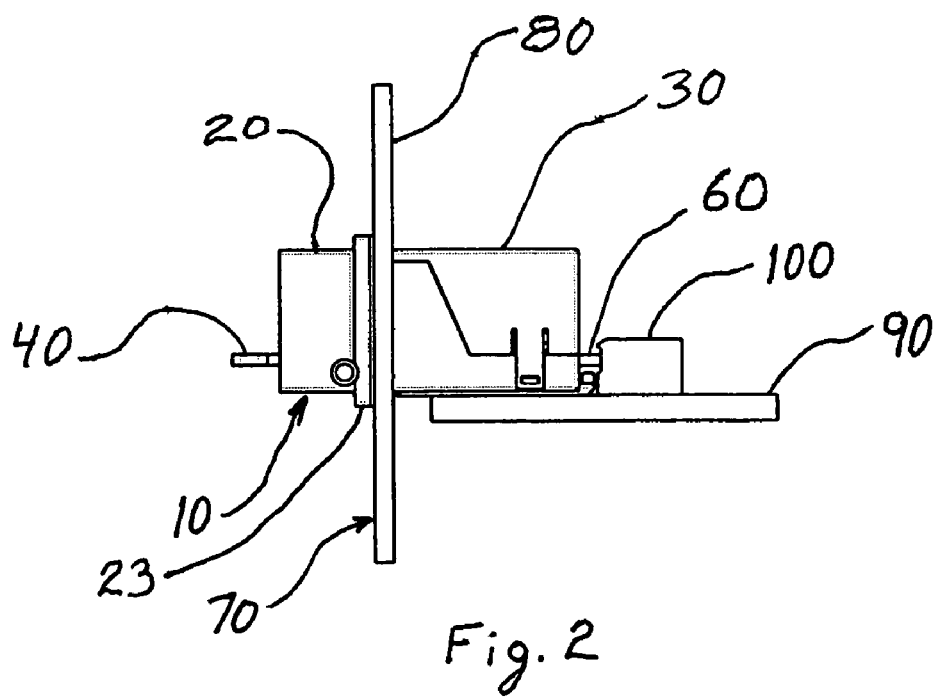
FIG. 2 is a side view of the optoelectronic device of FIG. 1 plugged into the host structure where the view is taken from a different angle.

FIG. 2 is a side view of the optoelectronic device 10 of FIG. 1 plugged into the host structure 70. The printed circuit board 60 electrically engages the connector 100. The flange 23 of the housing 11 is in electrical communication with the faceplate 80 of the host structure 70.

Figure 3:
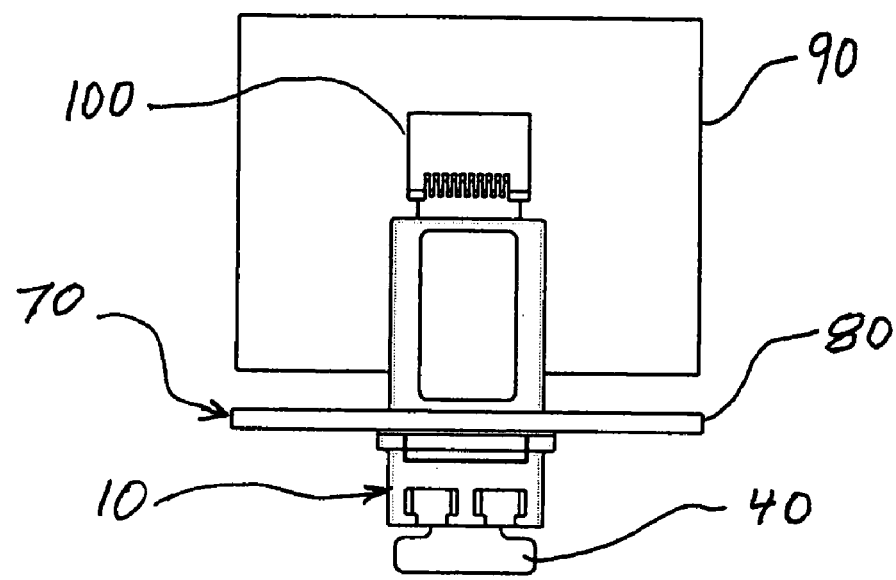
FIG. 3 is a top view of the optoelectronic device of FIG. 2.
Figure 4:
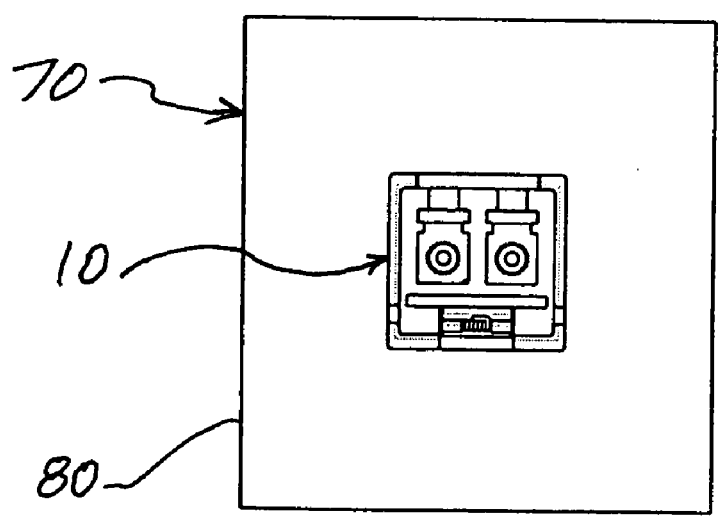
FIG. 4 is a front view of the optoelectronic device of FIG. 2.

FIG. 3 is a top view of the optoelectronic device 10 and host structure 70 of FIG. 2. FIG. 4 is a front view of the optoelectronic device 10 and host structure 70 of FIG. 2.

Figure 5:
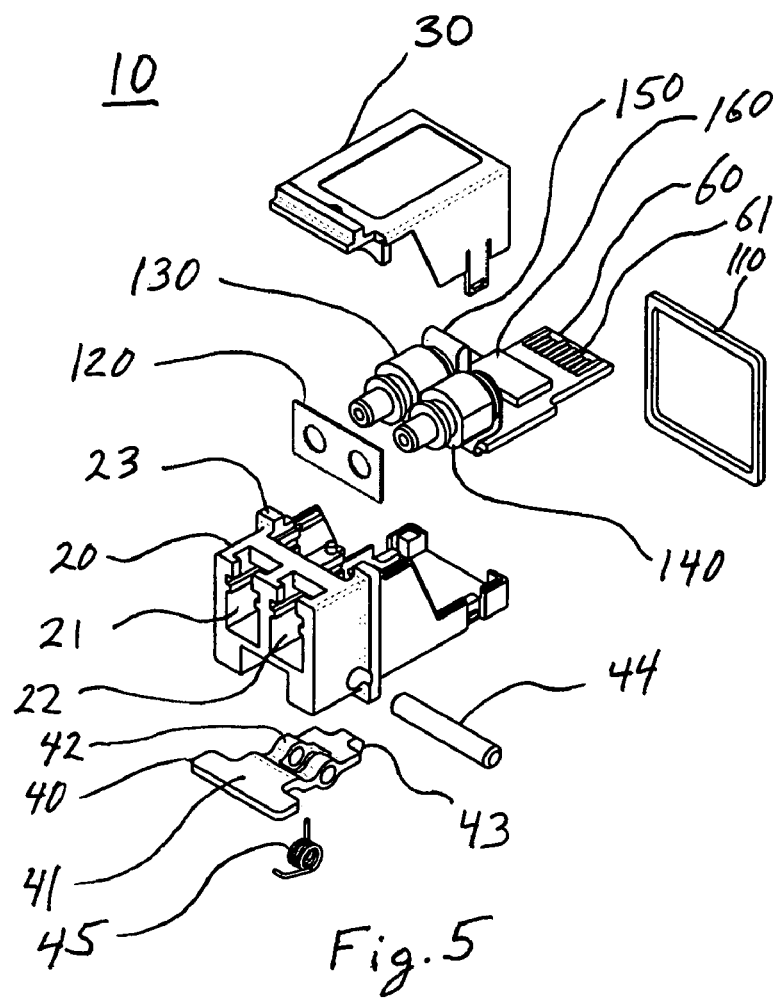
FIG. 5 is an exploded perspective view of the optoelectronic device of FIG. 1, with the host structure removed.

FIG. 5 is an exploded perspective view of the optoelectronic device 10 of FIG. 1 with the host structure removed for reasons of clarity. The first optical subassembly 130, and the second optical subassembly 140 are shown attached to the printed circuit board 60. Also attached to the printed circuit board are electronics 160 and a flex circuit 150. Flex circuitry 150 can be used to electrically connect the first optical subassembly 130 and the second optical subassembly to the printed circuit board 60. The electronics 160 can include a laser driver to drive a laser of a transmitting optical subassembly and an amplifier to amplify the electrical signal emitted by a receiving optical subassembly. The circuit board 60 includes contact traces 61. Also shown are the base 20, the cover 30, the lever 40, a pin 44, a spring 45, a first gasket 110, and a second gasket 120. The lever 40 includes an actuation surface 41, a rotatably mounted portion 42, and a hook 43.

The second gasket 120 is mounted on the first optical subassembly 130 and the second optical subassembly 140. The printed circuit board 60, the first optical subassembly 130, and the second optical subassembly 140 are mounted to the base 20 of the housing 11 so that the second gasket 120 forms an adequate seal between the two optical subassemblies 130, 140 and the base 20 of the housing 11 so as to minimize the amount of electromagnetic interference that is emitted into the first receptacle 21, and the second receptacle 22. The first and second receptacles are formed so as to receive LC style fiber optic connectors. However, any type or style of fiber optic connector can be accommodated in the receptacles 21, 22. The cover 30 is then attached to the base 20 and the first gasket 110 is mounted on the housing 11 adjacent to the flange 23. The spring 45 is paced in a gap formed in the lever near the rotatably mounted portion 42 of the lever, and then the assembly of the lever 40 and the spring 45 are placed adjacent to the housing 11 and the pin 43 secures the lever 40 and the spring 45 to the housing 11.

Figure 6:
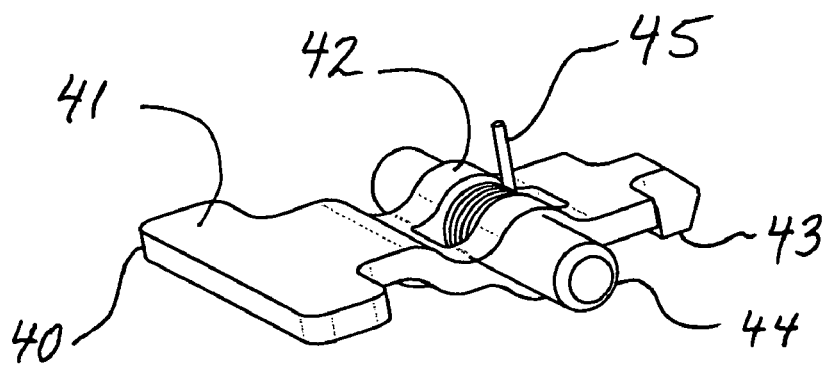
FIG. 6 is an expanded view of only the lever, spring, and axel of FIG. 5.

FIG. 6 is an expanded perspective view of the lever 40, spring 45, and the pin 44. However, as shown in FIG. 6, the pin 44 would need to be removed from the lever 40 before the lever 40, the spring 45, and the pin could be attached to the housing 11.

Figure 7:
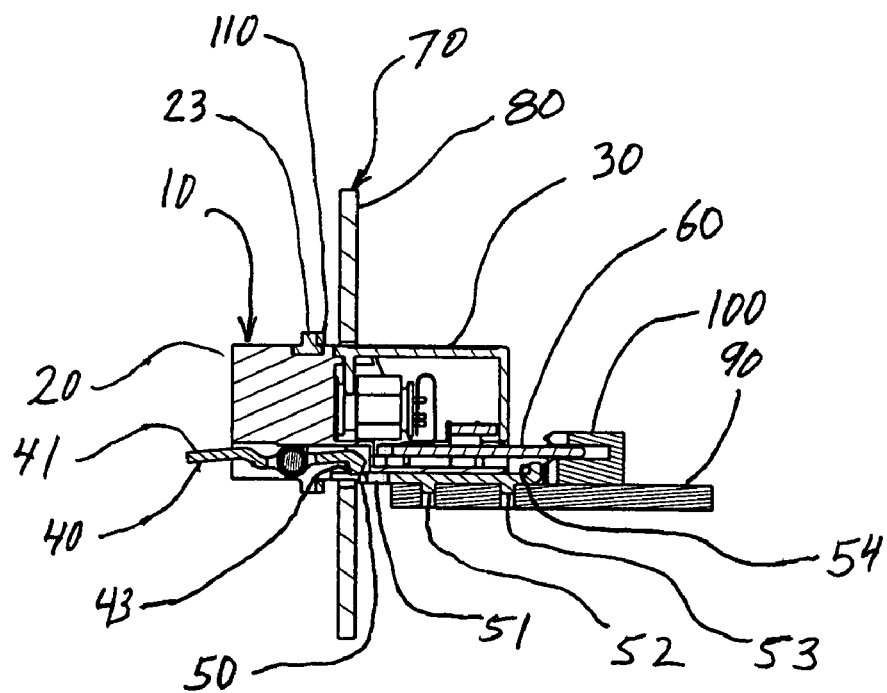
FIG. 7 is a cross-sectional side view of the optoelectronic device of FIG. 1 being introduced into the host structure.

FIG. 7 is a cross-sectional side view of the optoelectronic device 10 of FIG. 1 being introduced into the host structure 70. The contact traces 61 of the printed circuit board 60 are entering into engagement with the connector 100. The mounting rail 50 contacts the hook 43 of the lever 40 so as to cause the lever 40 to rotate thus causing the spring 45 to elastically deform. The deformed spring 45 urges the hook 43 of the lever 40 back toward an un-rotated position. The mounting rail also includes a first attachment point 52 and a second attachment point 53 where the first and second attachment points 52, 53 secure the mounting rail 50 to the circuit board 90 of the host structure 70. The mounting rail 50 also includes a stop surface 54. The stop surface 54 prevents the optoelectronic device 10 from being further introduced into the host structure 70 once the base 20 of the housing 11 contacts the stop surface 54 of the mounting rail 50 as shown in FIG. 8.

Figure 8:
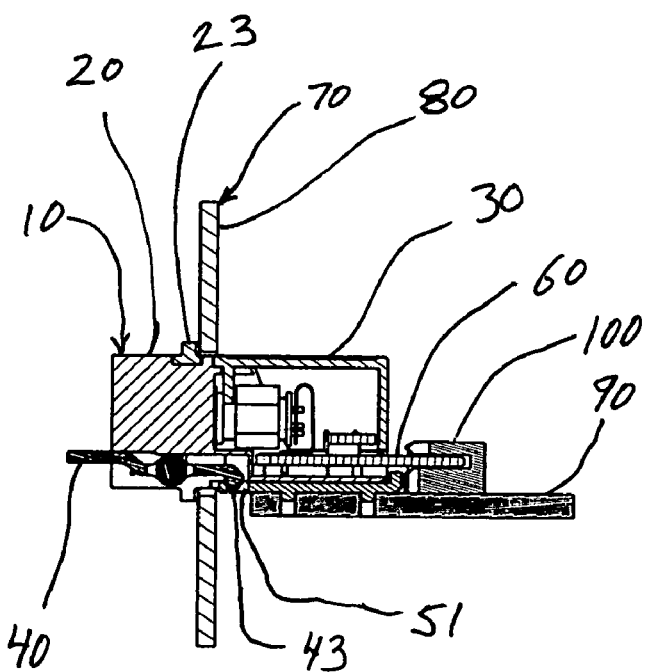
FIG. 8 is a cross-sectional side view of the optoelectronic device of FIG. 2 which is fully engaged with the host structure.

FIG. 8 is a cross-sectional side view of the optoelectronic device 10 of FIG. 7 fully engaged or plugged into the host structure 70. Additionally, the gasket 110 (shown in FIG. 7) is trapped between the flange 23 of the base 20 of the housing 11 and the faceplate 80 of the host structure 70. The gasket 110 is made of a conductive material and has compliant characteristics so as to perform the function of an EMI gasket. Thus, as shown in FIG. 8, the gasket 110 contacts both the flange 23 and the faceplate 80 so that the flange 23 is in electrical communication with the faceplate 80. Also, shown in FIG. 8 is the interaction of the hook 43 and the slot 51 of the mounting rail 50. While the housing 11 is introduced into the host structure 70, the hook 43 eventually lines up with the slot 51 of the mounting rail 50. Once this occurs, due to the urging of the deformed spring 45, the hook 43 enters the slot 51 so as to lock the optoelectronic device 10 or housing 11 to the host structure 70.

Figure 9:
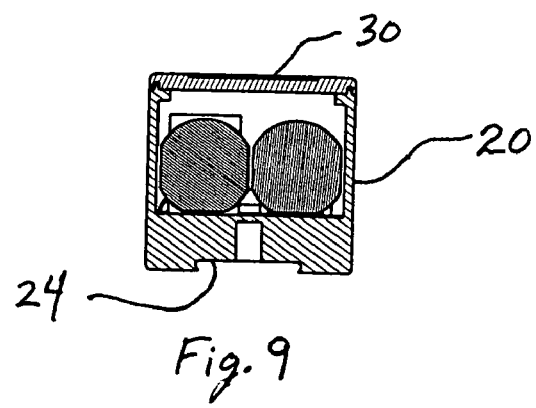
FIG. 9 is a cross-sectional end view of the optoelectronic device of FIG. 1 which shows the guide.
Figure 10:
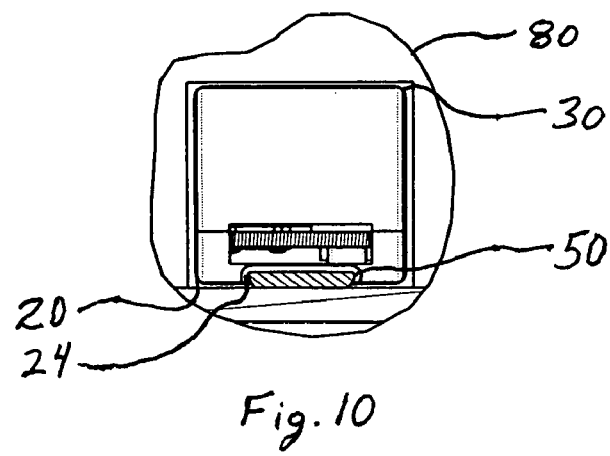
FIG. 10 is a partial cross-sectional end view of the optoelectronic device of FIG. 2 which is fully engaged with the host structure so as to illustrate the interaction of the guide with the mounting rail.

FIG. 9 is a cross-sectional end view of the optoelectronic device 10 which shows the guide 24 formed in the base 20 of the housing 11. FIG. 10 is a partial cross-sectional end view of the optoelectronic device 10 showing the interaction between the mounting rail 50 and the guide 24 of the housing 11 when the housing 11 is introduced into the host structure 70. The engagement between the guide 24 of the housing 11 helps to retain and maneuver the housing 11 into the host structure 70.

To remove the optoelectronic device 10 from the host structure 70, a user places a finger on the actuation surface 41 and pushes down on the actuation surface 41 so as to rotate the lever 40 and thus removing the hook 43 from engagement with the slot 51 of the mounting rail 50. The user can then pull the actuation surface 41 of the lever 40 toward the body of the user so as to remove the optoelectronic device 10 from the host structure 70.

The components of the optoelectronic device 10 and mounting rail 50 are made from suitable engineering materials. However, in order to reduce electromagnetic and/or radio frequency radiation, the base 20 and the cover 30 are preferably made of an electrically conductive material or a non-electrically conductive material where the non-electrically conductive material is coated with an electrically conductive material. When using the conductive gaskets 110, 120 along with the conductive base 20 and conductive cover 30, the optoelectronic device 10 does not require the use of a cage since the components of the optoelectronic device 10 provide sufficient shielding from the emission of electromagnetic or radio frequency radiation. Additionally, the mounting rail 50 can be made of an electrically conductive material so that the mounting rail 50 can be in electrical communication with the base 20 of the optoelectronic device 10.

Figure 11:
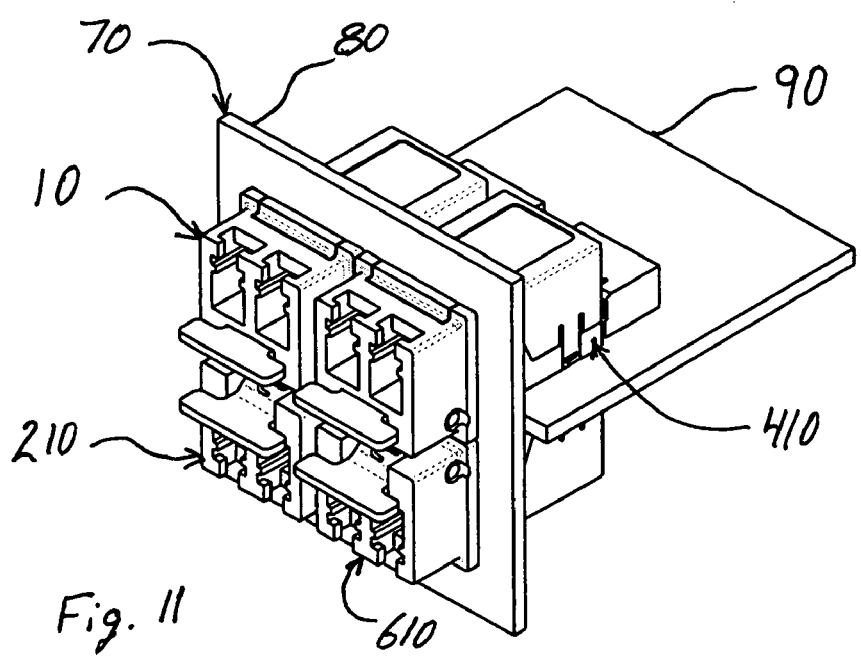
FIG. 11 is a perspective view of four optoelectronic devices fully engaged with the host structure.
Figure 12:
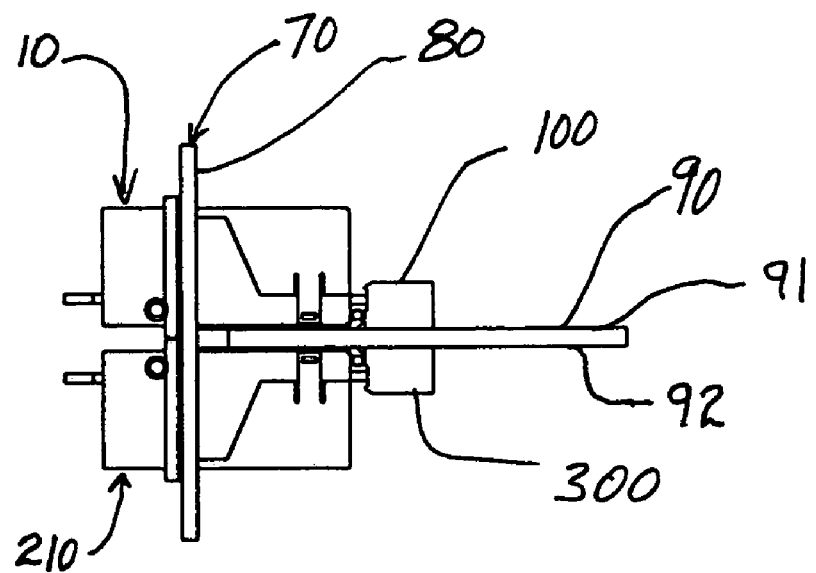
FIG. 12 is a side view of the assembly of FIG. 11.
Figure 13:
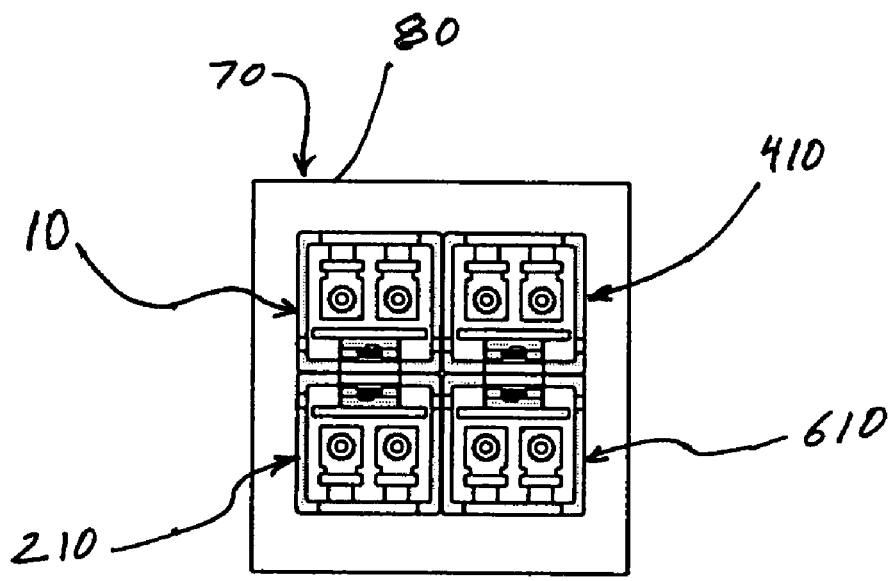
FIG. 13 is a front view of the assembly of FIG. 11.

FIGS. 11-13 disclose another embodiment of the invention. FIG. 11 is a perspective view of an assembly which includes four optoelectronic devices 10, 210, 410, 610 fully engaged with the host structure 70. FIG. 12 is a side view of the assembly of FIG. 11. FIG. 13 is a front view of the assembly of FIG. 11. Except for where the optoelectronic devices 210, 410, 610 are positioned on the circuit board, each is substantially the same as the optoelectronic device 10. Each optoelectronic device 210, 410, 610 is associated with a respective mounting rail just like mounting rail 50 is associated with optoelectronic device 10. As shown in FIGS. 12, and 13, the optoelectronic device 10 is mounted to a first side 91 of the circuit board 91 and the optoelectronic device 210 is mounted to a second side 92 of the circuit board 90. The arrangement of the optoelectronic device 10 relative to the optoelectronic device 210 is known as a belly-to-belly layout since the optoelectronic device 210 is separated from the optoelectronic device 10 by the circuit board 90 of the host structure 70 and the optoelectronic device 210 opposes the optoelectronic device 10.

As compared to the SFP transceivers, the optoelectronic device 10 does not require a cage. Also, as compared to the SFP transceivers, the optoelectronic device 10 does not use as much of the area of the circuit board 90 of the host structure 70. U.S. patent application Ser. No. 11/234,575, now U.S. Pat. No. 7,227,745, discloses a cageless, pluggable optoelectronic device which uses edges of a cut-out portion of a circuit board of a host structure for mounting the optoelectronic device to the host structure. Therefore, the optoelectronic device disclosed in U.S. patent application Ser. No. 11/234,575 exists on both sides of the circuit board of the host structure, and, as such, the arrangement of the optoelectronic device and the host structure disclosed in U.S. patent application Ser. No. 11/234,575 prevents a belly-to-belly layout. U.S. patent application Ser. No. 11/234,575 is hereby incorporated herein by reference.

Figure 14:
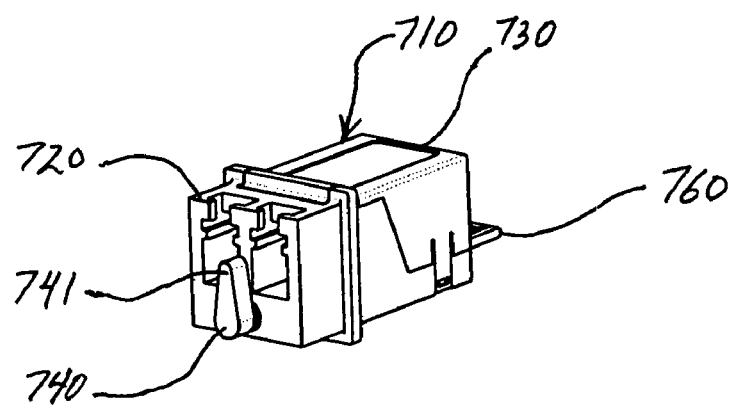
FIG. 14 is a perspective view of another embodiment of the optoelectronic device of the invention shown in an un-locked position.
Figure 15:
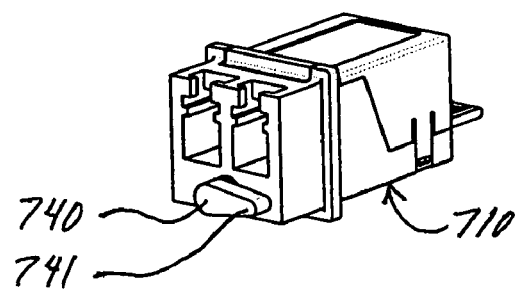
FIG. 15 is a perspective view of the optoelectronic device of FIG. 14 shown in a locked position.
Figure 16:
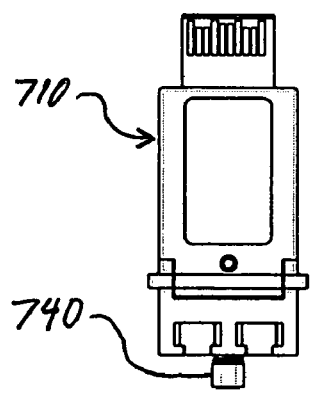
FIG. 16 is a top view of the optoelectronic device of FIG. 14.
Figure 17:
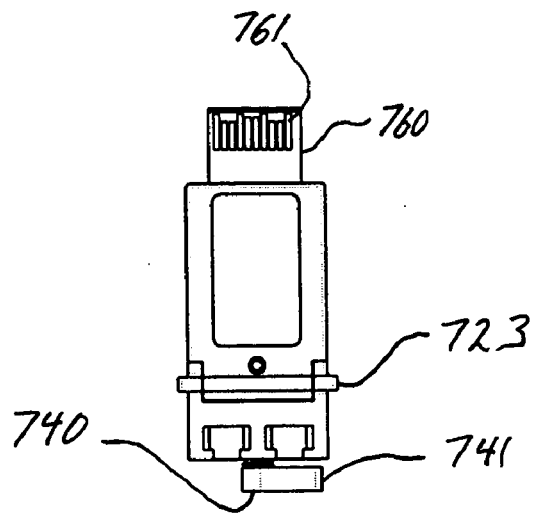
FIG. 17 is a top view of the optoelectronic device of FIG. 15.
Figure 18:
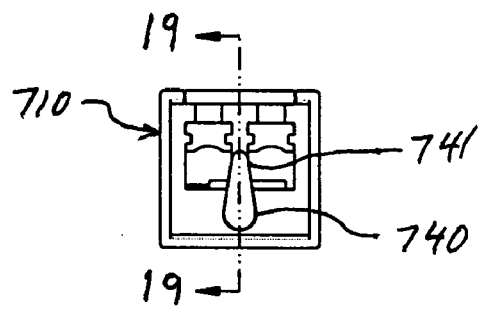
FIG. 18 is a front view of the optoelectronic device of FIG. 14.
Figure 19:
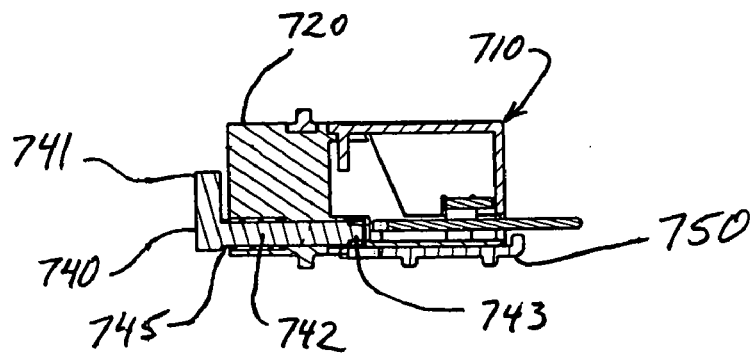
FIG. 19 is a cross-sectional side view of the optoelectronic device taken along section line 19-19 of FIG. 18.
Figure 20:
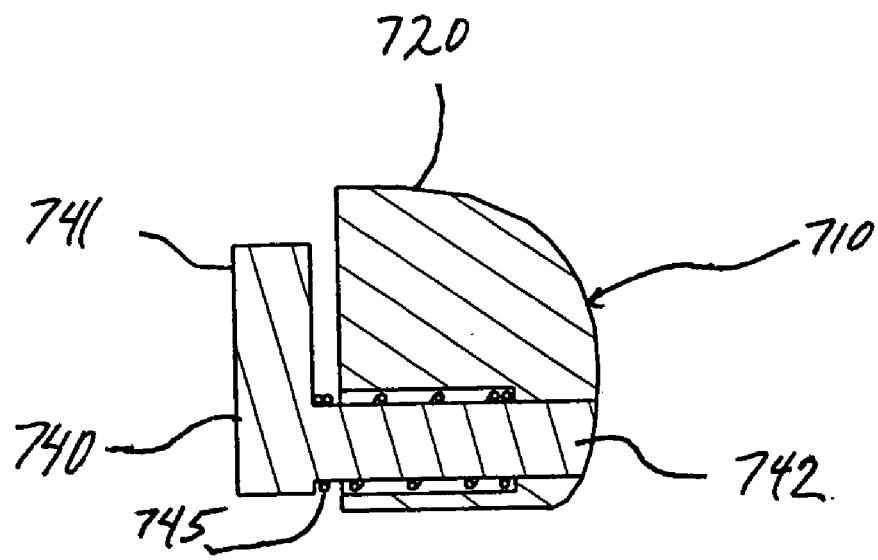
FIG. 20 is an expanded, partial view of the cross-sectional side view of the optoelectronic device of FIG. 19.

FIGS. 14-23 disclose another embodiment of the invention. FIG. 14 is a perspective view of an optoelectronic device 710. Optoelectronic device 710 is substantially similar to the optoelectronic device 10 except for the use of a lever 740 which rotates in a direction substantially ninety degrees to the direction in which the lever 40 rotated relative to a longitudinal length of the optoelectronic device. Lever 740 has an actuation surface 741, a rotatably mounted portion 742, and hook 743. The spring 745 is shaped so as to accommodate the shape of the lever 740 but it functions in a manner analogous to the spring 45 in relation to lever 40. The position of the lever 740 in FIG. 14 is in the un-locked position. FIG. 16 is a top view of the optoelectronic device 710 of FIG. 14 still in the un-locked position. FIG. 18 is a front view of the optoelectronic device 710 of FIG. 14. FIG. 19 is a cross-section side view of the optoelectronic device 710 taken along section line 19-19 of FIG. 18 in the un-locked position. FIG. 19 also shows the optoelectronic device 710 being associated with a mounting rail 750. FIG. 20 is an expanded, partial view of the cross-sectional side view of the optoelectronic device 710 of FIG. 19 which more clearly illustrates the interaction between the lever 740 and the spring 745. FIG. 14 discloses a base 720, a cover 730, and a printed circuit board 760.

Figure 21:
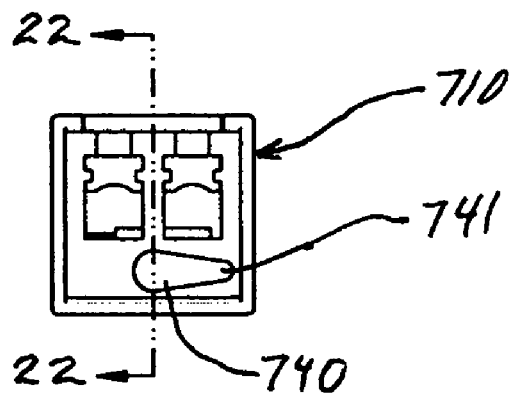
FIG. 21 is a front view of the optoelectronic device of FIG. 15.
Figure 22:
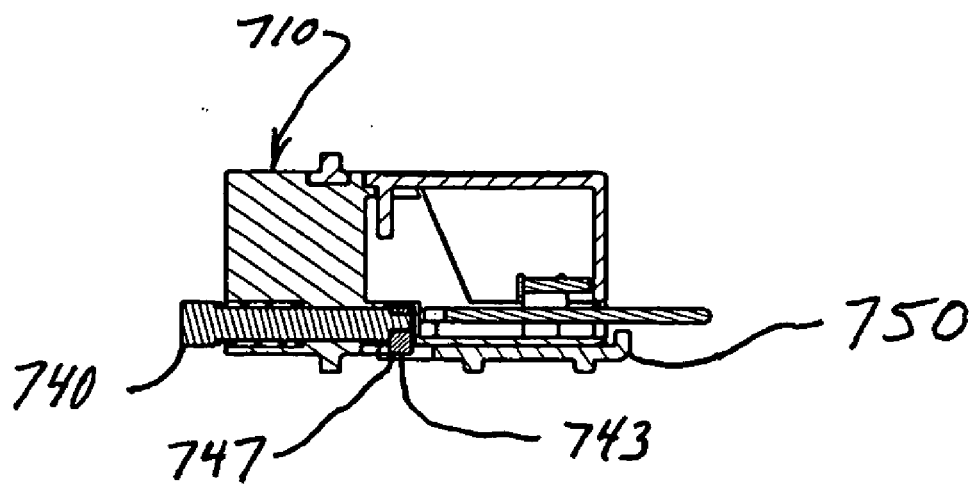
FIG. 22 is a cross-sectional side view of the optoelectronic device taken along section line 22-22 of FIG. 21.
Figure 23:
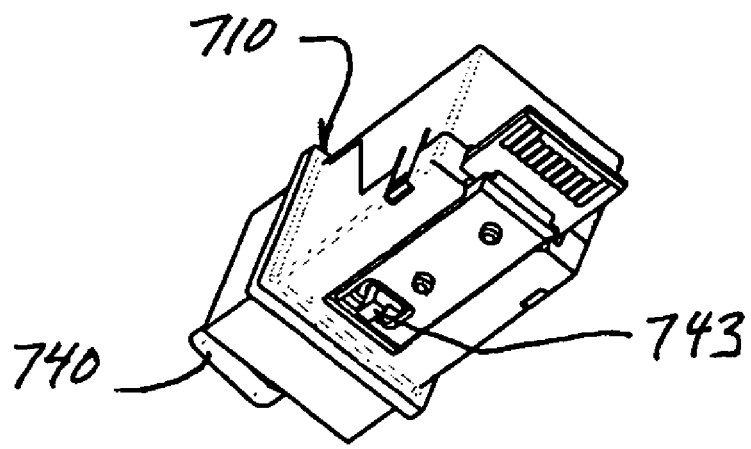
FIG. 23 is a perspective view of the optoelectronic device of FIG. 15 taken from another angle.

FIG. 15 is a perspective view of the optoelectronic device 710 having the lever 740 in a locked position. The spring 745 tends to keep the lever 740 in such a position relative to the base 720 when the actuation surface 741 is not activated by a user. FIG. 17 is a top view of the optoelectronic device 710 of FIG. 15 still in the locked position. FIG. 21 is a front view of the optoelectronic device 710 in the locked position. FIG. 22 is a cross-sectional side view of the optoelectronic device 710 taken along section line 22-22 of FIG. 21 in the locked position. FIG. 22 also shows the optoelectronic device 710 mounted to the mounting rail 750. FIG. 22 further shows that the lever 740 can include a part 747. FIG. 23 is a perspective view of the optoelectronic device 710 in the locked position which more clearly illustrates the hook 743. Similar to the hook 43 of the optoelectronic device 10, the hook 743 would engage the slot 51 of the mounting rail 50. FIG. 17 discloses a flange 723.

Figure 24:
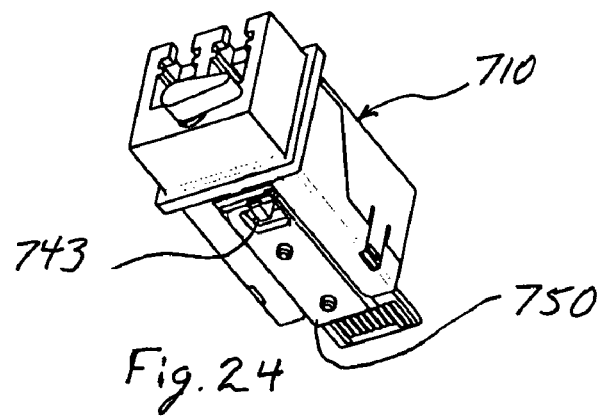
FIG. 24 is a perspective view of the optoelectronic device of FIG. 15 taken from yet another angle.
Figure 25:
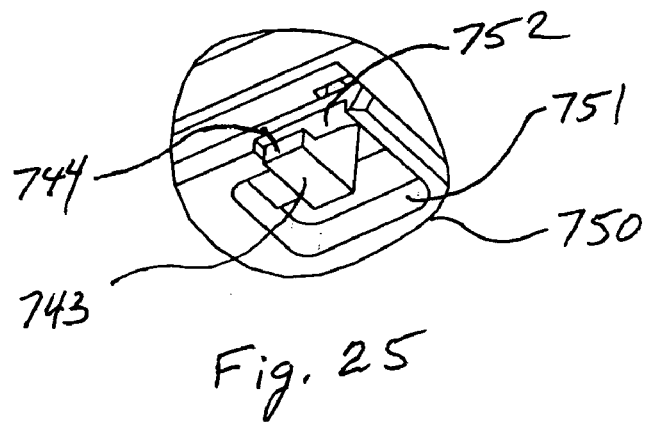
FIG. 25 is an expanded partial view of the hook of the lever and the mounting rail.
Figure 26:
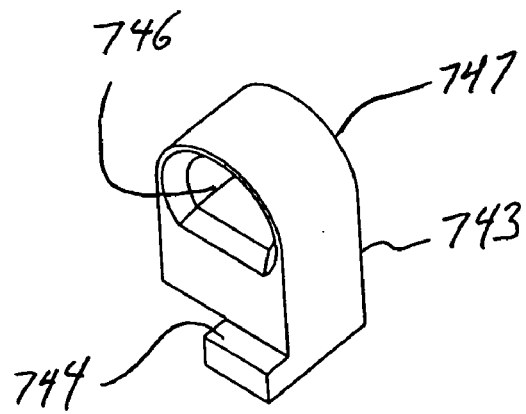
FIG. 26 is an expanded perspective view of a part of the lever.

FIG. 24 is a perspective view of the optoelectronic device 710 attached or mounted to the mounting rail 750. Also shown is the hook 743 engaged with the mounting rail 750. FIG. 25 is an expanded perspective view of the engagement of the hook 743 with a slot 751 of the mounting rail 750. The slot 751 includes a cut-out 752, and the hook 743 includes a tab 744 engaged within the cut-out 752 of the mounting rail 750. FIG. 26 is an expanded perspective view of a part 747 of the lever 740. The part 747 includes the hook 743, the tab 744 on the hook 743, and a D-shaped aperture 746. As shown in FIG. 22, the part 747 can be attached to the remainder of the lever 740 as a separate piece part and be attached to the remainder of the lever 740 by conventional engineering means such as, for example, adhesives, fasteners, mechanical upsetting, welding.

When the optoelectronic device 710 is locked to the mounting rail 750, the spring 745 urges the actuation surface 741 of the lever 740 away from the base 720 as can be visualized in FIG. 20. The spring 745 thus ensures that the tab 744 remains engaged with the cut-out 752 of the mounting rail 750 and the hook remains engaged with the slot 751 of the mounting rail 750 even during conditions of shock and vibration.

To remove the optoelectronic device 710 from the mounting rail 750, the user pushes the actuation surface 741 towards the base 720 of the optoelectronic device 710 so as to deflect the spring and cause the lever 740 to translate and thus disengaging the tab 744 of the lever 740 from the cut-out 752 of the mounting rail 750. The user then rotates the actuation surface 741 so as to rotate the rotatably mounted portion 742, along with the rest of the lever 740, so as to disengage the hook 743 of the lever 740 from the slot 751 of the mounting rail 750. The user can then pull the optoelectronic device 710 away from the mounting rail 750. In practice, the mounting rail 750 is typically attached to a circuit board of a host structure similar to the mounting rail 50 of FIG. 1.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
   a housing having a flange, and a guide;
   a printed circuit board mounted to the housing, the printed circuit board having contact traces;
   a first optical subassembly attached to the printed circuit board;
   a second optical subassembly attached to the printed circuit board;
   a gasket near the flange of the housing, the gasket is electrically conductive;
   a mounting rail attached to a circuit board of a host structure, the mounting rail having a slot;
   a lever rotatably mounted to the housing, the lever having a rotatably mounted portion, a hook, and an actuation surface for actuation by a user; and
   a spring interacting with the lever and the housing, the spring being elastically deformable, and wherein,
   when the housing is initially introduced into the host structure, the mounting rail enters the guide of the housing and contacts the hook, the contact between the hook and the mounting rail causes the lever to rotate, and the rotated lever causes the spring to elastically deform, the deformed spring urges the lever back toward an un-rotated position, and wherein, upon further insertion of the housing into the host structure, the hook lines up with the slot of the mounting rail, and due to the urging of the deformed spring, the hook enters the slot so as to lock the device to the host structure, and wherein,
   in a plugged into and locked position of the housing with the host structure, the gasket contacts and makes an electrical connection with a faceplate of the host structure and the flange of the housing so that the faceplate of the host structure is in electrical communication with the flange of the housing.

2. A device according to claim 1 wherein the first optical subassembly is a transmitting optical subassembly.

3. A device according to claim 2 wherein the second optical subassembly is a receiving optical subassembly.

4. A device according to claim 2 wherein the second optical subassembly is a transmitting optical subassembly.

5. A device according to claim 1 wherein the first optical subassembly is a receiving optical subassembly.

6. A device according to claim 5 wherein the second optical subassembly is a receiving optical subassembly.

7. A device according to claim 1, further comprising a spring interacting with the lever and the housing.

8. A device comprising:
   a first housing having a flange, and a guide;
   a first printed circuit board mounted to the first housing, the first printed circuit board having contact traces;
   a first optical subassembly attached to the first printed circuit board;
   a second optical subassembly attached to the first printed circuit board;

a first gasket near the flange of the first housing, the first gasket is electrically conductive;

a first mounting rail attached to a first surface of a circuit board of a host structure, the first mounting rail having a slot;

a first lever rotatably mounted to the first housing, the first lever having a rotatably mounted portion, a hook, and an actuation surface for actuation by a user, and wherein, in a plugged into and locked position of the first housing with the host structure, the first gasket contacts and makes an electrical connection with a faceplate of the host structure and the flange of the first housing so that the faceplate of the host structure is in electrical communication with the flange of the first housing, the hook of the first lever engages the slot of the first mounting rail, and the guide of the first housing engages the first mounting rail;

a second housing having a flange, and a guide;

a second printed circuit board mounted to the second housing, the second printed circuit board having contact traces;

a third optical subassembly attached to the second printed circuit board;

a fourth optical subassembly attached to the second printed circuit board;

a second gasket near the flange of the second housing, the second gasket is electrically conductive;

a second mounting rail attached to a second surface of the circuit board of the host structure, the second mounting rail having a slot; and a second lever rotatably mounted to the second housing, the second lever having a rotatably mounted portion, a hook, and an actuation surface for actuation by the user, and wherein, in a plugged into and locked position of the second housing with the host structure, the second gasket contacts and makes an electrical connection with the faceplate of the host structure and the flange of the second housing so that the faceplate of the host structure is in electrical communication with the flange of the second housing, the hook of the second lever engages the slot of the second mounting rail, and the guide of the second housing engages the second mounting rail, and wherein the second housing opposes the first housing, and the second housing is separated from the first housing by the circuit board of the host structure.

9. A device according to claim 8 wherein the first optical subassembly is a transmitting optical subassembly.

10. A device according to claim 9 wherein the second optical subassembly is a receiving optical subassembly.

11. A device according to claim 9 wherein the second optical subassembly is a transmitting optical subassembly.

12. A device according to claim 8 wherein the first optical subassembly is a receiving optical subassembly.

13. A device according to claim 12 wherein the second optical subassembly is a receiving optical subassembly.

* * * * *